(12) United States Patent
Anselment et al.

(10) Patent No.: US 8,740,083 B2
(45) Date of Patent: Jun. 3, 2014

(54) FOCUS ADJUSTMENT APPARATUS FOR A CODE READER

(75) Inventors: Christoph Anselment, Waldkirch (DE); Roland Gehring, Elzach (DE); Ulrich Nubling, Denzlingen (DE); Richard Nopper, Gutach (DE)

(73) Assignee: Sick AG, Waldkirch (DE)

( * ) Notice: Subject to any disclaimer, the term of this patent is extended or adjusted under 35 U.S.C. 154(b) by 140 days.

(21) Appl. No.: 13/412,267

(22) Filed: Mar. 5, 2012

(65) Prior Publication Data
US 2013/0062414 A1  Mar. 14, 2013

(30) Foreign Application Priority Data

Mar. 10, 2011  (EP) .................................... 11157740

(51) Int. Cl.
| G06K 7/10 | (2006.01) |
| G06K 15/12 | (2006.01) |
| G02B 5/08 | (2006.01) |
| G02B 26/00 | (2006.01) |
| G06K 7/14 | (2006.01) |
| G06K 5/00 | (2006.01) |
| G02B 26/08 | (2006.01) |
| G03B 3/10 | (2006.01) |

(52) U.S. Cl.
USPC ............ 235/462.41; 235/462.22; 235/462.23; 235/462.43; 235/462.24; 235/462.35

(58) Field of Classification Search
USPC ............. 235/462.22, 462.23, 462.41, 462.24, 235/462.35, 462.43
See application file for complete search history.

(56) References Cited

U.S. PATENT DOCUMENTS

| 4,000,501 | A | * | 12/1976 | Sakaguchi et al. ............... 396/83 |
| 4,096,495 | A | * | 6/1978 | Nesson et al. ................... 396/65 |
| 4,437,552 | A | * | 3/1984 | Toyama ........................... 192/26 |
| 4,777,352 | A | * | 10/1988 | Moore .......................... 235/404 |
| 4,948,235 | A | * | 8/1990 | Akitake ........................ 359/700 |
| 5,859,733 | A | * | 1/1999 | Miyano et al. ................. 359/824 |

(Continued)

FOREIGN PATENT DOCUMENTS

| DE | 3823714 A1 | 1/1989 |
| DE | 198 45 946 C1 | 8/1999 |
| EP | 1 258 765 B1 | 11/2004 |
| EP | 1 661 074 B1 | 7/2008 |

OTHER PUBLICATIONS

European Search Report cited in European Application No. 11157740.9 dated Jul. 11, 2011, five (5) pages.

*Primary Examiner* — Daniel Walsh
(74) *Attorney, Agent, or Firm* — Nath, Goldberg & Meyer; Jerald L. Meyer

(57) ABSTRACT

A focus adjustment apparatus (10) for a code reader (100) is provided which has an objective (12) having at least one lens and a drive (18) with a cam plate (16) for the positional adjustment of the objective (12). The objective (12) is supported in a parallel guide (14) having a coupling unit (32, 34) for the coupling of the cam plate (16) so that a rotational movement of the cam plate (16) adjusts the position of the objective (12) in the parallel guide (14) with a parallel shift of the objective plane. The coupling unit (32, 34) has a press-on element (32) for the play-free coupling of the parallel guide (14) to the cam plate (16) and a counter-bearing element (34) between the press-on element (32) and the drive (18) for relieving the drive (18) from the press-on element (34).

14 Claims, 3 Drawing Sheets

(56) References Cited

U.S. PATENT DOCUMENTS

Figure 1:
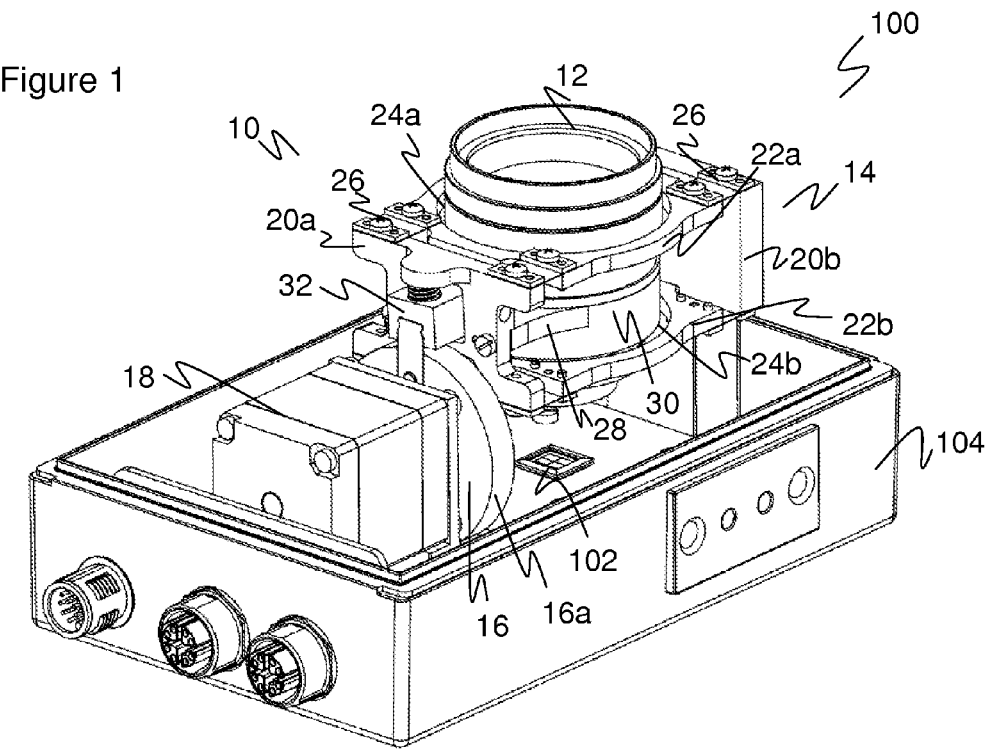

| | | | |
|---|---|---|---|
| 6,225,614 B1* | 5/2001 | Ono | 250/201.5 |
| 7,126,098 B2* | 10/2006 | Nakamura | 250/201.2 |
| 7,448,549 B2* | 11/2008 | Ito et al. | 235/454 |
| 8,063,367 B2* | 11/2011 | Johnson et al. | 250/330 |
| 8,294,117 B2* | 10/2012 | Kruit et al. | 250/396 R |
| 8,625,024 B2* | 1/2014 | Hsu | 348/374 |
| 2002/0096566 A1* | 7/2002 | Schwartz et al. | 235/462.42 |
| 2002/0140839 A1* | 10/2002 | Yahagi | 348/345 |
| 2003/0173494 A1* | 9/2003 | Nakamura | 250/201.2 |
| 2004/0252989 A1* | 12/2004 | Kayama et al. | 396/85 |
| 2005/0006558 A1* | 1/2005 | Wu et al. | 250/201.5 |
| 2005/0040237 A1* | 2/2005 | Ito et al. | 235/454 |
| 2010/0176319 A1* | 7/2010 | Nunnink et al. | 250/566 |
| 2011/0127406 A1* | 6/2011 | Sase | 250/201.3 |
| 2012/0161041 A1* | 6/2012 | Nunnink et al. | 250/566 |
| 2012/0268634 A1* | 10/2012 | Fukuda et al. | 348/302 |

* cited by examiner

FOCUS ADJUSTMENT APPARATUS FOR A CODE READER

The invention relates to a focus adjustment apparatus for a code reader for the positional adjustment of an objective having at least one lens as well as to a method of focus adjustment.

Camera-based code readers are increasingly being used for reading optical codes such as barcodes or matrix codes. In this process, an image of the code is taken and the code information is subsequently read out using digital image processing. In this respect, in industrial applications, the code reader is frequently mounted in a stationary manner at a conveyor belt on which objects bearing a code are conveyed past the code reader. On the other hand, handheld devices are also known which are guided over codes to be read.

Many code readers have a focus adjustment to take images with a sharp focus over a required working region. It is usually connected to an autofocus with which the spacing from the object to be taken is determined and the focal position is adjusted accordingly.

Known focus adjustment devices pivot a lever to which the optical system is fastened in order thus quickly to set a comparatively large spacing difference. This can above all be utilized for small lenses with a small weight and a small aperture. In this respect, a tilt of the lens and the aberrations associated therewith are accepted.

Another family of known focus adjustment devices uses a motor-moved eccentric member having a counter-spring on the moved lever. A high torque is required in this respect to compensate the counter-spring.

EP 1 513 094 B1 describes a code reader in which the light receiver is arranged on a pivot arm by whose movement the spacing from a fixed-position optical receiving system is varied to set the focal position. In this respect, the optical axis of the light receiver varies with respect to the optical receiving system so that each focus adjustment results in different aberrations.

An optoelectronic apparatus is known from DE 198 45 946 C1 for recognizing marks which are provided with defined contrast patterns and whose transmitted light beams are focused by adjustment of the position of an optical transmitting system. For this purpose, the optical transmitting system is mounted at a spring-supported bar and this bar is moved by means of a rotating eccentric device. The spacing between the transmitter and the optical transmitting device changes periodically during the rotational movement and so varies the focus setting. The eccentric device and thus the driven shaft is in this respect, however, subject to the strain of the counter-force of the spring support. In addition, the optical transmitting system also tilts with the focus adjustment so that aberrations arise.

It is therefore the object of the invention to provide a focus adjustment which moves an objective into a required focal position fast and without producing aberrations.

This object is satisfied by a focus adjustment apparatus for a code reader for the positional adjustment of an objective having at least one lens as well as by a method for focus adjustment in accordance with claim 1 and claim 15 respectively. In this respect, the invention starts from the basic idea of moving the objective with the aid of a cam plate which is driven, for example, by a stepper motor. To prevent a tilting of the optical axis of the objective, the objective is supported in a parallel guide. A press-on element provides a tight coupling of the parallel guide to the cam plate so that the moved lever always follows the cam plate without play. At the same time, the force of the press-on element is led off by a counter-bearing between the press-on element and the drive to relieve the drive from it. In this respect, further elements, for instance the cam plate itself, can also be located between the press-on element and the drive in addition to the counter-bearing.

The invention has the advantage that the focal position can also be adjusted fast, reliably and robustly with objectives having a higher weight. The focus adjustment apparatus is designed for a very high number of adjustment cycles and is very low maintenance. Due to the planoparallel displacement of the objective plane, the optical axis of the objective is maintained on changes to the focal position and aberrations due to tilting are thus avoided. The coupling between the drive and the objective movement is free of play and thus responds very fast and particularly exactly. The force of the press-on element nevertheless does not produce any torque on the drive. It is thereby possible to use the total torque of the drive for acceleration and thus for setting the focal position. The position of the objective after a focus adjustment can thus also be maintained at a fixed location with a minimal energy input once set. In this respect, the focus adjustment apparatus is characterized overall by a complexity which is low despite its performance capability.

The cam plate preferably has a projection which runs around in the peripheral direction. The cam plate forms a cylinder whose cross-sectional surface has the eccentricity required for a focus adjustment instead of a circular shape. The projection can be described in a particularly preferred embodiment such that this cylinder is designed as a hollow cylinder without a top, with the projection then being the jacket surface of this cylinder. The projection preferably extends completely outwardly in the radial direction because otherwise a smaller cam plate could be used.

The press-on element is preferably arranged radially from the outside and the counter-bearing element is arranged radially from the inside at the projection. The projection therefore runs between the press-on element and the counter-bearing element during the rotational movement of the cam plate. The counter-bearing element can thereby lead off the force of the press-on element from the drive so that no additional torque acts on the drive due to the freedom of play produced with the press-on element.

The press-on element and the counter-bearing element are preferably arranged disposed opposite one another perpendicular to the slope of the cam plate. The press-on element in this embodiment consequently admittedly stands perpendicular on the periphery of the cam plate, but tilted by the slope angle with respect to a perpendicular through the center of rotation of the cam plate. This arrangement results in a particularly effective and complete leading off of the torque from the press-on element acting on the motor.

The press-on element and the counter-bearing element preferably have a ball bearing. The cam plate can thus be supported without play with the smallest friction losses and can rotate between the ball bearings. The rotation of the cam plate is transferred directly to the parallel guide due to the freedom from play. The press-on element in particular presses its ball bearing toward the projection of the cam plate, while the counter-bearing element leads off the press-on force from the drive.

The cam plate preferably has a constant slope over its periphery. This applies even more preferably over the total periphery, with at least one small angular region of reverse slope naturally having to be provided in the vicinity of a zero angle so that the periphery of the cam plate closes again. A constant slope provides a linear transmission of the rotational movement to the focus adjustment. In addition, in the preferred arrangement of the press-on element and the counter-bearing element perpendicular to the slope of the cam plate its angle of engagement remains constant. Alternatively, cam plates having a plurality of angular ranges of different slopes are conceivable. The focus adjustment in each case uses that part angle range with which the required focal positions of the working region can be set.

The parallel guide is preferably spring-supported. Strain forces can thus be led off by the driven cam plate.

The parallel guide preferably has a displaceable first side wall having the coupling unit for the cam plate and a fixed-position, oppositely disposed second side wall, with the objective being arranged between the first side wall and the second side wall. The first side wall is consequently moved by the cam plate and, with the coupling unit, also has the press-on element and the counter-bearing element. The fixed-position second side wall is, for example, rigidly connected to a housing. The objective is displaced in parallel between the first side wall and the second side wall on focal position changes.

An objective holding arm is advantageously provided which holds the objective at its one end, in particular with the aid of a ring element around the objective, and which is rigidly connected to the first side wall at its other end. The objective holder arm can be fixedly connected to the side wall or be a part thereof. On a rotational movement of the cam plate, the first side wall with the arm is displaced and takes along the objective via the objective holding arm. Due to the parallel guide, the objective plane is maintained, that is it is only displaced in parallel, on the movement of the objective. The pivot movements which occur are taken up by the parallel guide, in particular by its spring support.

The parallel guide preferably has a front frame and a rear frame each having a respective opening for the objective. The frames thus connect the first and second side walls. The side walls and frames are substantially described by a rectangular shape despite various cut-outs and deformations to save material or to take up other components. The parallel guide of frame and side walls thus at least roughly forms an upwardly and downwardly open parallelepiped. A base or top of this parallelepiped remains open. Depending on the rotational position of the cam plate, the parallelepiped is distorted more or less to a prism having parallelograms as the base surface and top surface.

The front frame and the rear frame are preferably each connected by spring elements, in particular leaf springs, to the first side wall and to the second side wall. These spring elements provide a spring support of the parallel guide which takes up the distortion strains by the rotational movement of the cam plate and by the positional change of the objective. Even more preferably, a respective leaf spring is provided at each corner of the frames or side walls respectively so that a total of eight leaf springs are present at the eight corners of the circumscribing parallelepiped. The load is thus distributed very uniformly and the parallel guide is simultaneously particularly stable.

A shaft of the drive preferably stands perpendicular to the optical axis of the objective. The plane of the cam plate and the direction of movement of the parallel guide and of the objective in the parallel guide thus also stand perpendicular or at least substantially perpendicular to the shaft. In this manner, the coupling and the movement transfer can be converted effectively and exactly.

in a preferred further development, a camera-based code reader has a focus adjustment apparatus in accordance with the invention and an image sensor in whose optical axis the objective is arranged so that, on actuation of the drive by movement of the cam plate, the spacing between the objective and the image sensor is variable and thus the focal position is adjustable. Camera-based code readers in particular require sharp images to detect the complete code information. At the same time, a fast and frequent focus adjustment is required in conventional applications so that the robust, fast and exact focusing achieved with the invention is particularly well suited over a large number of adjustment cycles. The code reader preferably has an evaluation unit which is designed to read out and output code information of an imaged code from the image data of the image sensor.

Although the focus adjustment apparatus is primarily intended and conceived for a light receiver, it is equally suitable for the focusing of a transmitted beam. Here, the objective is as a rule designed in a much less complex manner and will usually only comprise a simple converging lens.

The method in accordance with the invention can be further developed in a similar manner and shows similar advantages in so doing. Such advantageous features are described in an exemplary, but not exclusive, manner in the subordinate claims dependent on the independent claims.

Figure 2:
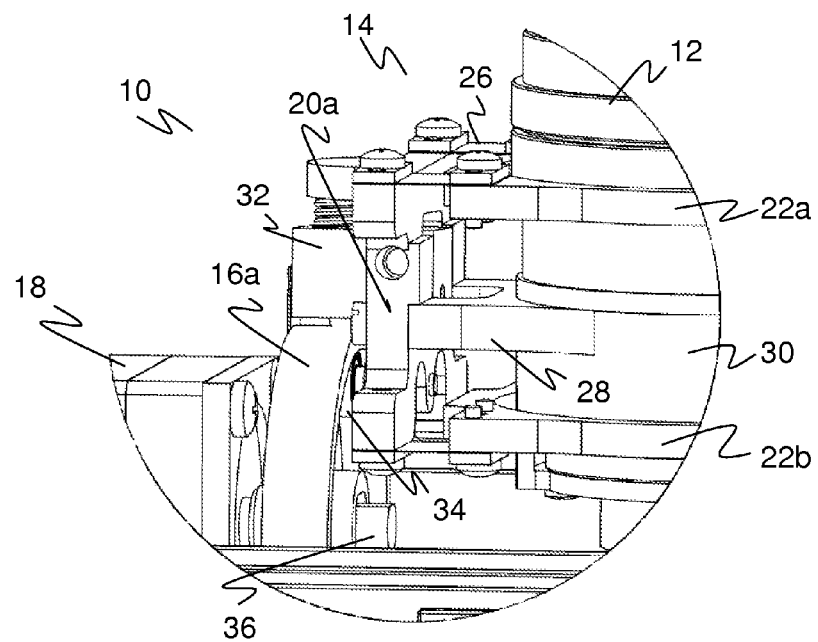
Figure 3:
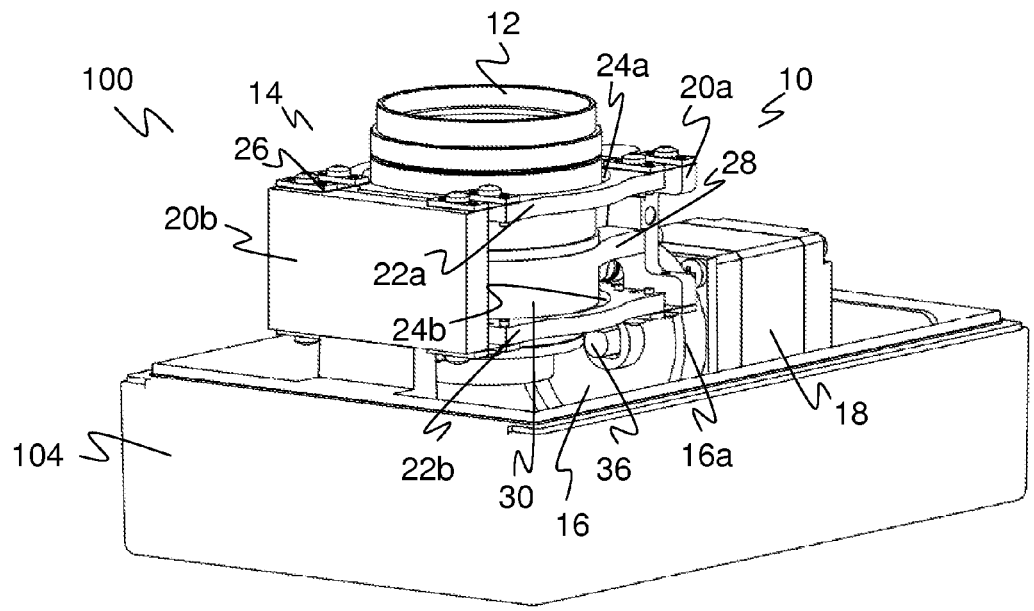
Figure 4:
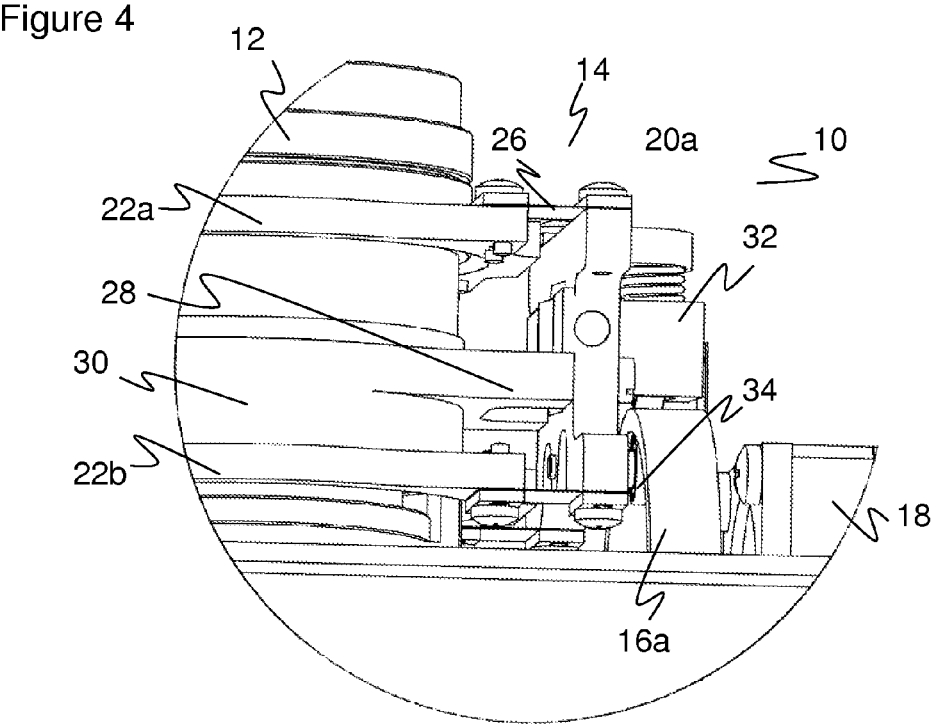
Figure 5:
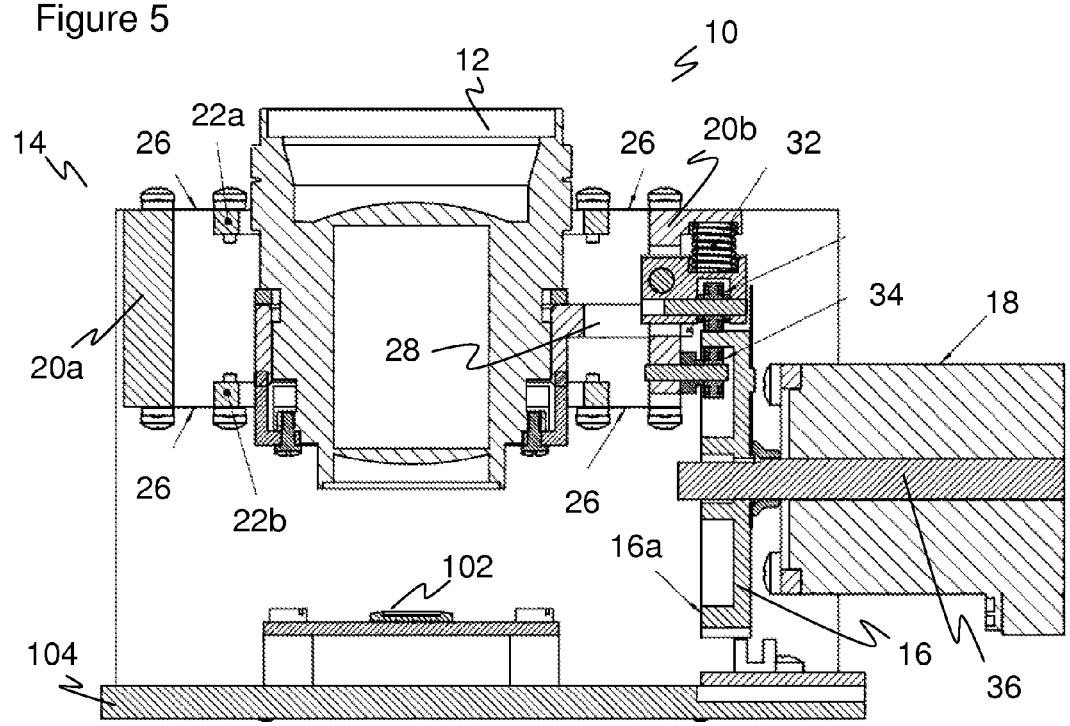
Figure 6:
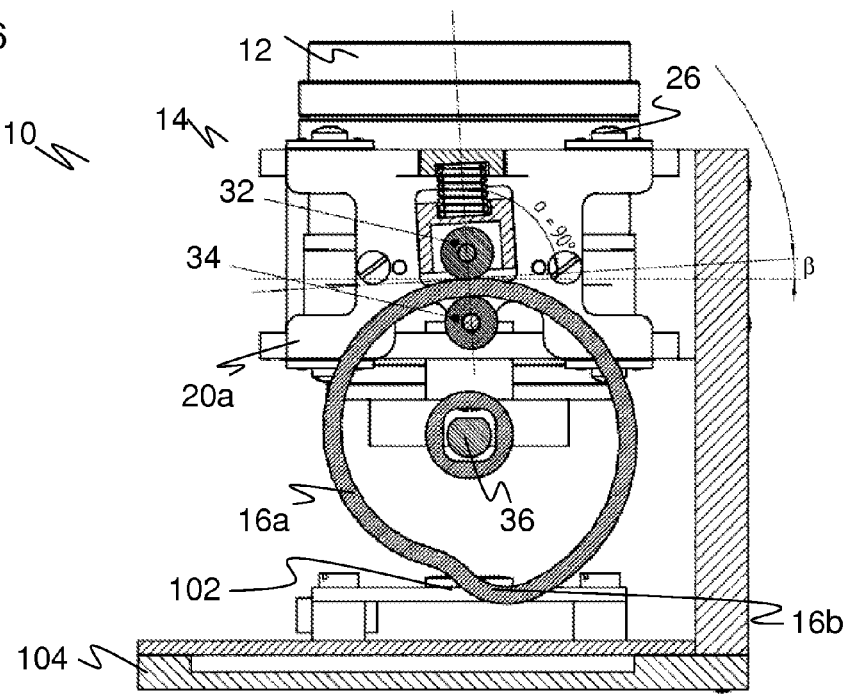

The invention will be explained in more detail in the following also with respect to further features and advantages by way of example with reference to embodiments and to the enclosed drawing. The Figures of the drawing show in:

FIG. 1 a three-dimensional view of an open housing with a focus adjustment in accordance with the invention;

FIG. 2 an enlarged detail of the focus adjustment in accordance with FIG. 1 from a perspective perpendicular to the front longitudinal housing side;

FIG. 3 a further three-dimensional view in which the apparatus in accordance with FIG. 1 is rotated by 180°;

FIG. 4 an enlarged detail in accordance with FIG. 3 from a perspective perpendicular to the front longitudinal housing side;

FIG. 5 a longitudinal section through the apparatus in accordance with FIG. 1; and FIG. 6 a cross-section through the apparatus in accordance with FIG. 1 at the level of a cam plate and of its coupling.

FIGS. 1 to 6 show different views of an embodiment of a focus adjustment apparatus 10 in accordance with the invention for the positional adjustment of an objective 12. Details of the objective 12 will not be explained because the focus adjustment apparatus 10 is suitable for the most varied objectives 12 with a different number of lenses, diaphragms and other usual elements of an objective.

The focus adjustment apparatus 10 in a preferred embodiment in a camera-based code reader 100 for setting the spacing between the objective 12 and a light receiver 102 is inserted between the objective 12 and the light receiver 102, in particular an image sensor having a plurality of light sensitive reception pixels arranged to form a row or a matrix. Further elements which may be present in a camera-based code reader 100 are not shown for reasons of clarity. These elements include, for example, a circuit board having an evaluation unit for the digital preparation of the image data of the light receiver 102 and for reading out code information or include a lighting unit.

The following description in most cases relates to all Figures equally, with individual features being better recognizable in specific views than in other views. In all the Figures, the same reference numerals each designate the same features. In this respect, FIG. 1 shows a three-dimensional total view of the code reader 100; FIG. 2 an enlarged detail of its focus adjustment apparatus 10; FIG. 3 a further three-dimensional view of the code reader 100 which is rotated by 180° with respect to FIG. 1; FIG. 4 an enlarged detail of its focus adjustment 10; FIG. 5 a longitudinal section; and FIG. 6 a cross-section.

The objective 12 is supported in a parallel guide 14 which is coupled to a cam plate 16. A rotational movement of the cam plate 16 produced by a drive 18, for example by a stepper motor, is thus transferred into a movement in translation of the objective 12 with a parallel shift of the objective plane.

The parallel guide 14 has a first side wall 20a and a second side wall 20b as well as a front frame 22a and a rear frame 22b. In this respect, this relative direction information in the terms is to be understood from the view of the objective 12 along its optical axis. The first side wall 20a is movably coupled to the cam plate 16, whereas the second side wall 20b also remains positionally fixed on positional changes of the objective 12 due to the connection to a housing 104 of the code reader 100, for example. The front frame 22a and the rear frame 22b each have a circular opening 24a-b through which the objective 24 projects without contacting the frames 22a-b and with at least a certain lateral tolerance toward transverse movements.

The side walls 20a-b are connected at their respective corners to the frames 22a-b over a total of eight leaf springs 26 corresponding to the eight corners which are adjacent pairwise and thus form a spring support for the parallel guide 14. A type of parallelepiped without top and base arises geometrically from the side walls 20a-b and the frames 22a-b abstracted from different indentations and openings.

An objective holder arm 28 rigidly connected to the first side wall 20a or formed in once piece with this side wall 20a projects into the interior of this parallelepiped and holds the objective 12, for example with the aid of a ring element 30 engaging around the objective 12. Movements of the side wall 20a are thus transferred directly to movements of the objective 12.

The coupling of the cam plate 16 to the parallel guide 14 is likewise arranged at the first side wall 20a. This can also be expressed such that the coupling is located at the objective holder arm 28 since this linguistic difference is without significance for the mechanical movement due to the rigid connection between the side wall 20a and the objective holding arm 28.

The coupling has a press-on element 32, for example having a spring, and a counter-bearing element 34. Both the press-on element 32 and the counter-bearing element 34 include a ball bearing. The cam plate 16 runs in the double ball bearing guide thus formed.

As can best be recognized in the cross-section in accordance with FIG. 6, the cam plate 16 is not a simple solid disk, but rather has a peripheral projection 16a or a jacket surface at its outer periphery. The press-on element 32 engages at the outside of the projection 16a; the counter-bearing element 34 at the inner side opposite the press-on element 32.

The cam plate 16 has a uniform, constant slope. A linear transfer between the rotational movement of the cam plate 16 and the displacement of the objective 12 can thus be achieved. To be able to close the projection 16 in the peripheral direction, the cam plate has a compensation region 16b with a larger slope directed oppositely which can simultaneously serve as an abutment for the rotational movement.

The preferably constant slope angle β of the cam plate 16 can likewise best be read in FIG. 6. The connection line between the press-on element 32 and the oppositely disposed counter-bearing element 34 stands perpendicular to the slope line of the cam plate 16, as designated in FIG. 6 by an angle α=90°. The connection line is therefore tilted by the slope angle β with respect to the associated radius of the cam plate, namely with respect to a perpendicular in FIG. 6. The press-on element 32 is likewise tilted by this slope angle β so that the force of the press-on element 32 acts perpendicular on the projection 16a and on the counter-bearing element 34.

The ball bearing of the press-on element 32 is cushioned via said press-on element at the projection 16a of the cam plate 16 and thus ensures the freedom from play of the coupling. Since the cam plate 16 runs with its projection 16a in the double ball bearing guide of the press-on element 32 and the counter-bearing element 34, the counter-bearing element 34 takes up the force produced for the freedom from play by the press-on element 32 and thus leads it off from a shaft 36 of the drive 18. A torque-free, play-free coupling of the drive to the parallel guide 14 onto the drive 18 is hereby achieved.

The drive 18 is now actuated and the cam plate 16 thereby rotated for a focus adjustment. The rotational movement takes place about an angle which corresponds to a desired focus adjustment. For this purpose, a characteristic of object distances from associated angles can be stored in advance, for example by simulation, calculation or by a teaching process.

When the shaft 36 rotates and in so doing takes along the cam plate 16 by the same amount, the press-on element 32 is urged outwardly or the counter-bearing element 34, assisted by the press-on force of the press-on element 32, is drawn inwardly by the slope at the projection 16a depending on the direction of rotation. Since the objective holder arm 28 is rigidly connected to the first side wall 20a at which the coupling is attached to the press-on element 32 and to the counter-bearing element 34, the objective 12 held by the objective holder arm 28 moves away from the shaft 36 or toward the shaft 36 depending on the direction of rotation. The direction of movement of the objective 12 is thus perpendicular to the shaft 36 and thus to the axis of rotation of the cam plate 16.

The parallel guide 14 thus provides that the objective 12 is not tilted, but rather its objective plane is subject to parallel shift. The first side wall 20a with the objective holder arm 28 is moved to the front or to the rear by the rotation of the cam plate 16. In so doing, the frame 22a-b is pivoted with respect to the fixed-position second side wall 20b, but also with respect to the first side wall 20a. The tension forces are in this respect taken up by the leaf springs 28.

If the enveloping body which the side walls 20a-b and the frame 22a-b form is imagined as a parallelepiped in a position of rest without the effect of force onto the leaf springs 28, the displacement of the first side wall 20a effects a shear movement of the open base or top of this parallelepiped from a rectangle to a non-right angled parallelogram. The enveloping body accordingly becomes a prism with the parallelogram as the base surface. The optical axis of the objective 12 is not tilted in this respect. The objective plane is only displaced to the front or to the rear in a first approximation. On an exact observation, there is also a slight lateral parallel offset. A parallel offset without tilting, however, does not play any role for the sharp focus of the images taken by the light receiver 102. The parallel offset does not produce any additional aberrations, but at most a slight image offset which is without consequence on a single taking of a code and which can be compensated by digital postprocessing on the compilation of larger images from a plurality of images taken in the meantime under focus adjustment.

The invention claimed is:

1. A focus adjustment apparatus (10) of an optical code reader (100) which has an objective (12) having at least one lens, an objective plane and a drive (18) with a cam plate (16) operable to positionally adjust of the objective (12), wherein the objective (12) is supported in a parallel guide (14), wherein the parallel guide (14) has a coupling unit (32, 34) coupling the parallel guide to the cam plate (16) so that a rotational movement of the cam plate (16) adjusts the position of the objective (12) in the parallel guide (14) with a parallel shift of the objective plane; and wherein the coupling unit (32, 34) has a press-on element (32) enabling play-free coupling of the parallel guide (14) to the cam plate (16) as well as a counter-bearing element (34) located between the press-on element (32) and the drive (18), the counter-bearing element relieving the drive (18) from the press-on element (32), the counter bearing element (34) absorbing force provided by the rotational movement of the cam plate onto the parallel guide whereby the counter bearing element prevents torque from the force from being provided to the drive from the press on element, thereby enabling the play-free coupling, wherein the cam plate (16) has a projection (16a) extending around it in a peripheral direction substantially normal to a face of the cam plate (16), wherein the press-on element (32) is arranged along an outside cam plate circumference at the projection and the counter-bearing element (34) is arranged along an inside cam plate circumference at the projection (16a) and wherein the focus adjustment apparatus is operable to adjust focusing of the optical code reader.

2. A focus adjustment apparatus (10) in accordance with claim 1, wherein the press-on element (32) and the counter-bearing element (34) are arranged disposed opposite one another perpendicular to the slope of the cam plate (16).

3. A focus adjustment apparatus (10) of an optical code reader (100) which has an objective (12) having at least one lens, an objective plane and a drive (18) with a cam plate (16) operable to positionally adjust of the objective (12), wherein the objective (12) is supported in a parallel guide (14), wherein the parallel guide (14) has a coupling unit (32, 34) coupling the parallel guide to the cam plate (16) so that a rotational movement of the cam plate (16) adjusts the position of the objective (12) in the parallel guide (14) with a parallel shift of the objective plane; and wherein the coupling unit (32, 34) has a press-on element (32) enabling play-free coupling of the parallel guide (14) to the cam plate (16) as well as a counter-bearing element (34) located between the press-on element (32) and the drive (18), the counter-bearing element relieving the drive (18) from the press-on element (32), the counter bearing element (34) absorbing force provided by the rotational movement of the cam plate onto the parallel guide whereby the counter bearing element prevents torque from the force from being provided to the drive from the press on element, thereby enabling the play-free coupling, wherein the press-on element (32) and the counter-bearing element (34) have a ball bearing and wherein the focus adjustment apparatus is operable to adjust focusing of the optical code reader.

4. A focus adjustment apparatus (10) in accordance with claim 1, wherein the cam plate (16) has a constant slope outside of a small reset region (16b) of negative curvature.

5. A focus adjustment apparatus (10) in accordance with claim 1, wherein the parallel guide (14) is resiliently supported.

6. A focus adjustment apparatus (10) of an optical code reader (100) which has an objective (12) having at least one lens, an objective plane and a drive (18) with a cam plate (16) operable to positionally adjust of the objective (12), wherein the objective (12) is supported in a parallel guide (14), wherein the parallel guide (14) has a coupling unit (32, 34) coupling the parallel guide to the cam plate (16) so that a rotational movement of the cam plate (16) adjusts the position of the objective (12) in the parallel guide (14) with a parallel shift of the objective plane; and wherein the coupling unit (32, 34) has a press-on element (32) enabling play-free coupling of the parallel guide (14) to the cam plate (16) as well as a counter-bearing element (34) located between the press-on element (32) and the drive (18), the counter-bearing element relieving the drive (18) from the press-on element (32), the counter bearing element (34) absorbing force provided by the rotational movement of the cam plate onto the parallel guide whereby the counter bearing element prevents torque from the force from being provided to the drive from the press on element, thereby enabling the play-free coupling, wherein the parallel guide (14) has a first side wall (20a) displaceable by the cam plate (16), the displaceable first side wall (20a) having the coupling unit (32, 34) of the cam plate (16) and an oppositely disposed second side wall (20b) of fixed-position, with the objective (12) being arranged between the first side wall (20a) and the second side wall (20b) and wherein the focus adjustment apparatus is operable to adjust focusing of the optical code reader.

7. A focus adjustment apparatus (10) in accordance with claim 6, wherein an objective holder arm (28) having first and second ends is provided which holds the objective (12) at its first end, and which is rigidly connected to the first side wall (20a) at its second end.

8. A focus adjustment apparatus in accordance with claim 7, wherein the objective holder arm (28) holds the objective (12) at its first end with the aid of a ring element (30) around the objective (12).

9. A focus adjustment apparatus (10) of an optical code reader (100) which has an objective (12) having at least one lens, an objective plane and a drive (18) with a cam plate (16) operable to positionally adjust of the objective (12), wherein the objective (12) is supported in a parallel guide (14), wherein the parallel guide (14) has a coupling unit (32, 34) coupling the parallel guide to the cam plate (16) so that a rotational movement of the cam plate (16) adjusts the position of the objective (12) in the parallel guide (14) with a parallel shift of the objective plane; and wherein the coupling unit (32, 34) has a press-on element (32) enabling play-free coupling of the parallel guide (14) to the cam plate (16) as well as a counter-bearing element (34) located between the press-on element (32) and the drive (18), the counter-bearing element relieving the drive (18) from the press-on element (32), the counter bearing element (34) absorbing force provided by the rotational movement of the cam plate onto the parallel guide whereby the counter bearing element prevents torque from the force from being provided to the drive from the press on element, thereby enabling the play-free coupling, wherein the parallel guide (14) has a front frame (22a) and a rear frame (22b) each having an opening (34a-b) for the objective (12), wherein the front frame (22a) and the rear frame (22b) are each connected by spring elements (26) to the first side wall (20a) and to the second side wall (20b), and wherein the focus adjustment apparatus is operable to adjust focusing of the optical code reader.

10. A focus adjustment apparatus (10) in accordance with claim 9, wherein said spring elements are leaf springs.

11. A focus adjustment apparatus (10) in accordance with claim 1, wherein the drive (18) has a shaft (36) and the shaft (36) stands perpendicular to the optical axis of the objective (12).

12. A camera-based code reader (100) having a focus adjustment apparatus (10) which has an objective (12) having at least one lens, an objective plane and a drive (18) with a cam plate (16) operable to positionally adjust of the objective (12), wherein the objective (12) is supported in a parallel guide (14), wherein the parallel guide (14) has a coupling unit (32, 34) coupling the parallel guide to the cam plate (16) so that a rotational movement of the cam plate (16) adjusts the position of the objective (12) in the parallel guide (14) with a parallel shift of the objective plane; and wherein the coupling unit (32, 34) has a press-on element (32) enabling play-free coupling of the parallel guide (14) to the cam plate (16) as well as a counter-bearing element (34) located between the press-on element (32) and the drive (18), the counter-bearing element relieving the drive (18) from the press-on element (32), the counter bearing element (34) absorbing force provided by the rotational movement of the cam plate onto the parallel guide whereby the counter bearing element prevents torque from the force from being provided to the drive from the press on element, thereby enabling the play-free coupling, there being an image sensor (102) in whose optical axis the objective (12) is arranged so that, on the actuation of the drive (18) by movement of the cam plate (16), the spacing between the objective (12) and the image sensor (102) is variable and the focal position can thus be adjusted, wherein the cam plate (16) has a projection (16*a*) extending around it in a peripheral direction substantially normal to a face of the cam plate (16), wherein the press-on element (32) is arranged along an outside cam plate circumference at the projection and the counter-bearing element (34) is arranged along an inside cam plate circumference at the projection (16*a*) and wherein the focus adjustment apparatus is operable to adjust focusing of the optical code reader.

13. A code reader (100) in accordance with claim 12, wherein the image sensor delivers image data, the code reader having an evaluation unit which is designed to read out and output code information of an imaged code from image data of the image sensor (102).

14. A method for focus adjustment of a camera-based code reader (100), wherein the focal position is set by setting the spacing between an image sensor (102) and an objective (12) of the code reader (100), the objective having an objective plane, in that the position of the objective (12) is adjusted by means of a drive (18) and by means of a cam plate (16) having a projection (16*a*) extending around it in a peripheral direction substantially normal to a face of the cam plate (16), and wherein the parallel guide (14) has a displaceable first side wall (20*a*) having a coupling unit (32,34) coupling to the cam plate (16), wherein the coupling unit (32,34) has a press-on element (32) for play-free coupling of the parallel guide (14) to the cam plate (16) as well as a counter-bearing element (34) located between the press-on element (32) and the drive (18) absorbing force provided by the rotation movement of the cam plate (16) onto the parallel guide (14), the parallel guide further comprising an oppositely disposed second side wall (20*b*) of fixed-position, with the objective (12) being arranged between the first side wall (20*a*) and the second side wall (20*b*), the method comprising the steps of:

moving the objective (12) with a parallel shift of the objective plane by a rotational movement of the cam plate, transferring the rotational movement of the cam plate (16) without play onto a parallel guide (14) of the objective (12) with a force, and taking up the force by a counter-bearing element (34) so that the force does not produce any torque on the drive (18), thus effecting the play-free coupling between the cam plate (16) and the parallel guide (14).

\* \* \* \* \*